United States Patent
Lee et al.

(10) Patent No.: US 10,585,212 B2
(45) Date of Patent: *Mar. 10, 2020

(54) POLARIZING PLATE AND IMAGE DISPLAY APPARATUS COMPRISING SAME

(71) Applicant: LG CHEM, LTD., Seoul (KR)

(72) Inventors: Mi Rin Lee, Daejeon (KR); Kwang Seung Park, Daejeon (KR); Eunsoo Huh, Daejeon (KR); Jun Wuk Park, Daejeon (KR); Sung Hyun Jeon, Daejeon (KR)

(73) Assignee: LG CHEM, LTD., Seoul (KR)

( * ) Notice: Subject to any disclaimer, the term of this patent is extended or adjusted under 35 U.S.C. 154(b) by 380 days.

This patent is subject to a terminal disclaimer.

(21) Appl. No.: 15/507,871

(22) PCT Filed: Sep. 25, 2015

(86) PCT No.: PCT/KR2015/010204
§ 371 (c)(1),
(2) Date: Mar. 1, 2017

(87) PCT Pub. No.: WO2016/052951
PCT Pub. Date: Apr. 7, 2016

(65) Prior Publication Data
US 2017/0307781 A1    Oct. 26, 2017

(30) Foreign Application Priority Data
Sep. 30, 2014    (KR) .......... 10-2014-0132034

(51) Int. Cl.
*G02B 5/30*    (2006.01)
*G02B 1/111*    (2015.01)
*G02B 1/14*    (2015.01)
*C08K 5/10*    (2006.01)
*C08L 1/10*    (2006.01)

(52) U.S. Cl.
CPC ............ *G02B 1/111* (2013.01); *C08K 5/10* (2013.01); *C08L 1/10* (2013.01); *G02B 1/14* (2015.01); *G02B 5/3025* (2013.01)

(58) Field of Classification Search
CPC ...... G02B 1/14; G02B 5/3025; G02B 5/3033; G02B 5/305; G02F 1/133528; C08K 5/10; C08L 1/10; C09D 133/14
USPC ........................ 359/487.02; 349/96
See application file for complete search history.

(56) References Cited

U.S. PATENT DOCUMENTS

| | | | |
|---|---|---|---|
| 4,277,319 A | 7/1981 | Nyi et al. | |
| 9,442,223 B2* | 9/2016 | Park | G02B 1/14 |
| 9,500,779 B2* | 11/2016 | Park | G02B 5/3025 |
| 9,599,753 B2* | 3/2017 | Lee | G02B 1/18 |

(Continued)

FOREIGN PATENT DOCUMENTS

| | | |
|---|---|---|
| KR | 20090023975 A | 3/2009 |
| WO | 2013069907 A1 | 5/2013 |

*Primary Examiner* — Ricky D Shafer
(74) *Attorney, Agent, or Firm* — Dentons US LLP

(57) ABSTRACT

The present invention relates to a polarizing plate including: a polarizer and a protective layer formed on at least one surface of the polarizer, in which the protective layer is a cured product of a radical curable composition including: (A) a first compound represented by [Formula 1]; (B) a second compound represented by Formula B; and (C) a radical initiator, and an image display device including the same.

17 Claims, 1 Drawing Sheet

(56) References Cited

U.S. PATENT DOCUMENTS

| | | | | |
|---|---|---|---|---|
| 9,651,716 B2 * | 5/2017 | Huh | .......................... | G02B 1/14 |
| 9,733,398 B2 * | 8/2017 | Huh | ..................... | G02B 5/3033 |
| 9,902,883 B2 * | 2/2018 | Yoon | .................... | C09J 153/005 |
| 9,952,362 B2 * | 4/2018 | Lee | ........................... | C09J 4/00 |
| 10,012,772 B2 * | 7/2018 | Huh | ......................... | G02B 1/14 |
| 10,132,976 B2 * | 11/2018 | Park | ....................... | G02B 5/305 |
| 10,156,667 B2 * | 12/2018 | Lee | ........................ | G02B 5/305 |
| 10,228,491 B2 * | 3/2019 | Huh | ......................... | G02B 1/10 |
| 2007/0299211 A1 | 12/2007 | Chen et al. | | |
| 2010/0165263 A1 | 7/2010 | Lee et al. | | |
| 2011/0003908 A1 | 1/2011 | Vermeulen et al. | | |

\* cited by examiner

POLARIZING PLATE AND IMAGE DISPLAY APPARATUS COMPRISING SAME

TECHNICAL FIELD

This application is a National Stage Application of International Application No. PCT/KR2015/010204, filed Sep. 25, 2015, and claims the benefit of Korean Patent Application No. 10-2014-0132034, filed Sep. 30, 2014, the contents of which are incorporated herein by reference in their entirety for all purposes as if fully set forth below.

The present invention relates to a polarizing plate and an image display device including the same, and more particularly, to a polarizing plate which is excellent in elastic strength and heat resistance and has improved adhesive strength between a polarizer and a protective layer, and may be manufactured in a thin type, and an image display device including the same.

BACKGROUND ART

A polarizing plate has been generally used in a structure in which a protective film is laminated on one surface or both surfaces of a polarizer using an adhesive, the polarizer being formed of a polyvinyl alcohol (hereinafter, referred to as 'PVA')-based resin dyed with a dichroic dye or iodine for durability and water resistance. In this case, triacetyl cellulose (TAC)-based films have been frequently used as the protective film in view of excellent optical transparency or moisture permeability.

Meanwhile, as liquid crystal display devices have been recently developed into mobile devices such as laptop-type personal computers, mobile phones, and car navigation systems, thinning in thickness and reduction in weight have been required for a polarizing plate constituting an image display device. However, in a polarizing plate in which TAC films and the like are laminated as the protective film as described above, it is difficult to set the thickness of the protective film to 20 μm or less from the viewpoint of handleability during operation or durability performance, so that there is limitation in thinning in thickness and reduction in weight.

In order to solve the problems as described above, there has been proposed a technology of forming a transparent thin film layer by providing a protective film on only one surface of a polarizer and painting an active energy-ray curable composition on the opposite surface, or painting the active energy-ray curable composition on both surfaces of the polarizer without the protective film. Meanwhile, the active energy-ray curable composition proposed up to now may be divided into a radical-curable composition and a cationic curable composition in accordance with the curing method. In this case, when a transparent thin film layer is formed by using a cationic curable composition, the transparent thin film layer has an advantage of excellent adhesion with a polarizer, but has many disadvantages of manufacturing processes due to a slow curing rate and a low degree of curing.

In order to solve these problems of the cationic curable composition, there has been proposed a technology of forming a transparent thin film layer by using a radical curable composition including an acrylic compound as a main component. However, since the radical curable composition including an acrylic compound as a main component has a faster curing rate than that of the cationic curable composition, but the protective layer has a low glass transition temperature after radical curing, there is a problem in that a polarizing plate manufactured by using the composition has poor heat resistance reliability.

Further, the radical curable composition is required to have high elastic strength because cracks are generated on a PVA polarizer when thermal shock is evaluated due to structural characteristics of the polarizing plate. In general, in order to increase elastic strength of the composition, a polymer constituting the composition needs to be crystallized or have a high degree of crosslinking, and the degree of crosslinking of the composition has been increased by using a multifunctional acrylate-based compound such as TMPTA, PETA, and DPHA as an actual method. However, there is a problem in that the multifunctional acrylate is recklessly used to significantly decrease adhesive strength with a PVA polarizer, thereby incurring peeling.

Therefore, in order to solve the aforementioned problems, there is need for a new polarizing plate having a high glass transition temperature and elastic strength, and excellent adhesive strength between a protective layer and a polarizer, while having a protective layer which may be formed by curing radicals.

DETAILED DESCRIPTION OF THE INVENTION

[Technical Problem]

Figure 1A:
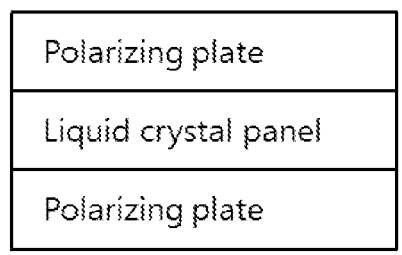
FIG. 1A is a schematic representation of a display device according to an exemplary embodiment. The display device comprises a liquid crystal panel between two polarizing plates.
Figure 1B:
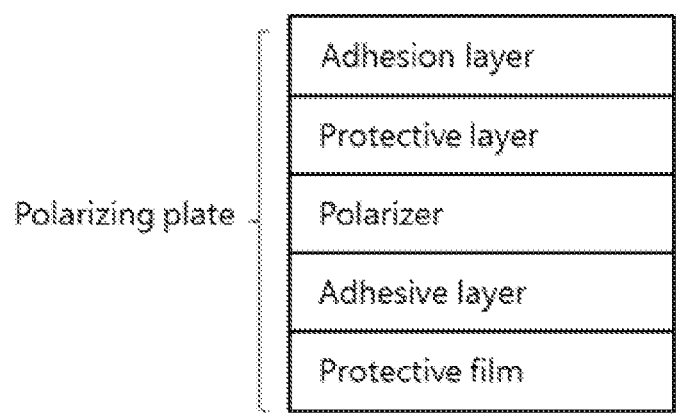
FIG. 1B is a schematic representation of a polarizing plate according to an exemplary embodiment. The polarizing plate includes a polarizer with a first protective layer formed on at least one surface of the polarizer and an adhesion layer provided on an upper portion of the first protective layer. The polarizing plate further includes a second protective film attached through an adhesive layer to a surface opposite to the surface of the polarizer on which the first protective layer is formed.

In order to solve the aforementioned problems, the present invention has been made in an effort to provide a polarizing plate which includes a protective layer having excellent elastic strength and glass transition temperature, has excellent adhesive strength between a polarizer and the protective layer, and may be manufactured in a thin type, and an image display device including the same.

[Technical Solution]

According to an exemplary embodiment of the present specification, provided is a polarizing plate including: a polarizer; and a protective layer formed on at least one surface of the polarizer, in which the protective layer is a cured product of a radical curable composition including: (A) a first compound represented by the following [Formula 1]; (B) a second compound represented by the following Formula B; and (C) a radical initiator.

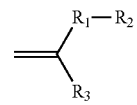

[Formula 1]

In [Formula 1], $R_1$ is an ester group; or an ether group, $R_2$ is a C1 to C10 alkyl group having at least one hydroxy group (—OH); or a C4 to C10 cycloalkyl group having at least one hydroxy group (—OH), and $R_3$ is hydrogen; or a C1 to C10 alkyl group.

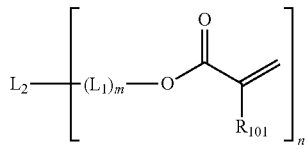

[Formula B]

In [Formula B], $R_{101}$'s are the same as or different from each other, and are each independently hydrogen; or a C1 to C10 alkyl group, $L_1$ is a C1 to C10 alkylene group; —O—; —N(H)—; —C(=O)—; or —C(=O)O—, n is 2 or 3, when n is 2, $L_2$ is —N(H)C(=O)N(H)—; or —N(H)C(=O)-$L_3$-C(=O)N(H)—, when n is 3, $L_2$ is a trivalent C1 to C10 alkyl group which is unsubstituted or substituted with a hydroxy group, and at least one of $L_1$ is —N(H)—, $L_3$ is a direct bond; a C1 to C10 alkylene group; —O—; —N(H)—; —C(=O)—; or —C(=O)O—, m is an integer of 1 to 10, and when m and n are each 2 or more, two or more structures in the parenthesis are the same as or different from each other.

In this case, the first compound may be, for example, one or more selected from the group consisting of compounds represented by the following [Formula 2] to [Formula 9].

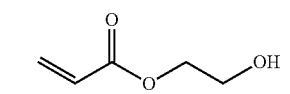

[Formula 2]

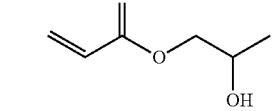

[Formula 3]

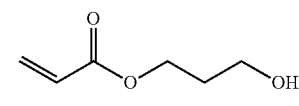

[Formula 4]

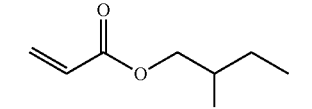

[Formula 5]

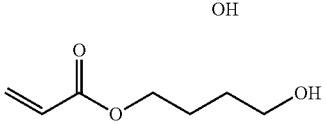

[Formula 6]

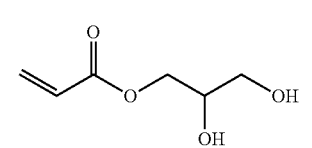

[Formula 7]

[Formula 8]

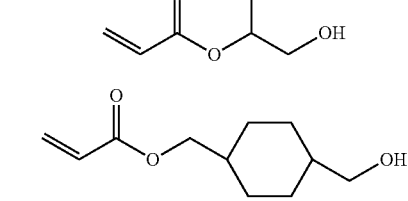

[Formula 9]

According to an exemplary embodiment of the present specification, provided is a polarizing plate including: a polarizer; and a protective layer formed on at least one surface of the polarizer, in which the protective layer is a cured product of a radical curable composition including: (A) a first compound represented by the following [Formula 1]; (B) a second compound obtained by reacting an aziridine compound with (meth)acrylic acid or a (meth)acrylate having a hydroxy group; and (C) a radical initiator.

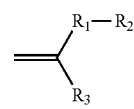

[Formula 1]

In [Formula 1], $R_1$ is an ester group; or an ether group, $R_2$ is a C1 to C10 alkyl group having at least one hydroxy group (—OH); or a C4 to C10 cycloalkyl group having at least one hydroxy group (—OH), and $R_3$ is hydrogen; or a C1 to C10 alkyl group.

Meanwhile, the aziridine compound may be selected from the group consisting of, for example, compounds represented by the following [Formula 10] to [Formula 12].

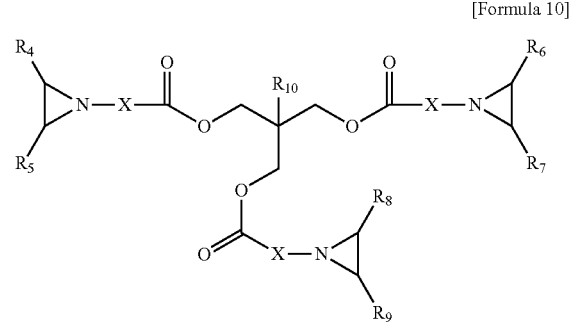

[Formula 10]

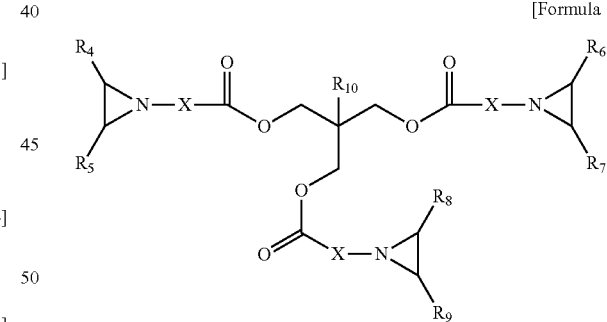

In [Formula 10], $R_4$ to $R_9$ are each independently a hydrogen atom; or a $C_{1\ to\ 12}$ alkyl group, $R_{10}$ is a hydrogen atom; or a substituted or unsubstituted $C_{1\ to\ 5}$ alkyl group, and X is a $C_{1\ to\ 5}$ alkylene group.

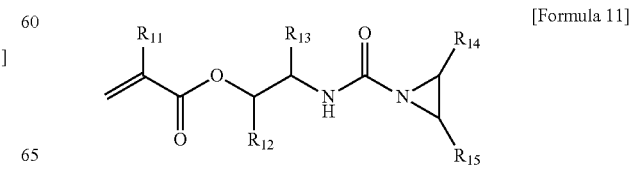

[Formula 11]

In [Formula 11], $R_{11}$ is a hydrogen atom; or a methyl group, and $R_{12}$ to $R_{15}$ are each independently a hydrogen atom; or a $C_{1\ to\ 12}$ alkyl group.

[Formula 12]

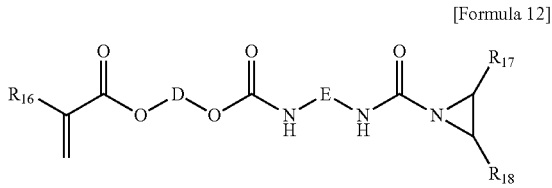

In [Formula 12], $R_{16}$ is a hydrogen atom; or a methyl group, $R_{17}$ and $R_{18}$ are each independently a hydrogen atom; or a $C_{1\ to\ 12}$ alkyl group, D is a $C_{2\ to\ 5}$ alkylene group; or an alkylene glycol having a repeating unit of 2 to 100, and E is a substituted or unsubstituted $C_{4\ to\ 20}$ alkylene group, or a $C_{6\ to\ 20}$ arylene group.

In this case, the (meth)acrylate having a hydroxy group may be represented by the following [Formula 13].

[Formula 13]

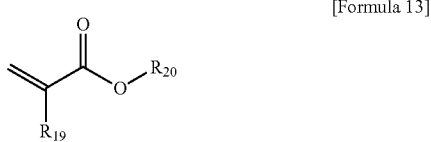

In [Formula 13], $R_{19}$ is a hydrogen group; or a methyl group, and $R_{20}$ is a C1 to C10 alkyl group having at least one hydroxy group (—OH); or a C4 to C10 cycloalkyl group having at least one hydroxy group (—OH).

Meanwhile, it is preferred that the radical curable composition includes 40 to 85 parts by weight of the first compound, 5 to 50 parts by weight of the second compound, and 0.1 to 10 parts by weight of the radical initiator, based on 100 parts by weight of the radical curable composition.

Further, the radical curable composition may additionally include an acrylic monomer including an amine group as a third compound, in which the third compound may be one or more selected from the group consisting of N,N-dimethyl acrylamide, acryloyl morpholine, N-isopropyl acrylamide, N,N-diethyl acrylamide, N,N-dimethylamino propylacrylamide, and 1,2,2,6,6-pentamethyl-4-piperidinyl methacrylate.

Meanwhile, the radical curable composition preferably has a glass transition temperature of 60° C. or more after UV curing, and a storage modulus of 1,000 MPa to 5,000 MPa which is measured by a dynamic mechanical analysis (DMA) method at 25° C. after curing.

Meanwhile, the protective layer preferably has a thickness of 0.1 µm to 20 µm.

Meanwhile, in the polarizing plate of the present invention, a protective film may be further attached to a surface opposite to the surface of the polarizer, on which the protective layer is formed, through an adhesive layer.

Further, the polarizing plate of the present invention may further include an adhesion layer on the upper portion of the protective layer.

Meanwhile, the polarizer is preferably a polyvinyl alcohol-based film in which iodine or a dichroic dye is adsorbed and oriented.

In another aspect, the present invention provides an image display device including the polarizing plate.

[Advantageous Effects]

The polarizing plate of the present invention has excellent water resistance and heat resistance because a radical curable composition for forming a protective layer has a high glass transition temperature after curing, and has excellent elastic strength and excellent adhesive strength between a polarizer and a protective layer.

Further, the polarizing plate of the present invention has a protective layer having a smaller thickness than that of a polarizing plate having a transparent protective film in the related art, and thus, may be manufactured in a thin type.

[Best Mode]

Hereinafter, preferred exemplary embodiments of the present invention will be described. However, the exemplary embodiments of the present invention may be modified into various other forms, and the scope of the present invention is not limited to the exemplary embodiments which will be described below. Further, the exemplary embodiments of the present invention are provided to more fully explain the present invention to a person with ordinary skill in the art.

As a result of intensive studies, the present inventors have found that when a compound, which is obtained by reacting an aziridine compound with (meth)acrylic acid or a (meth)acrylate having a hydroxy group, is added to a radical curable composition for forming a protective layer and used, the object can be achieved, thereby completing the present invention. More specifically, a polarizing plate according to the present invention is a polarizing plate including: a polarizer; and a protective layer formed on at least one surface of the polarizer, in which the protective layer is a cured product of a radical curable composition including: (A) a first compound represented by the following [Formula 1]; (B) a second compound represented by the following Formula B; and (C) a radical initiator.

[Formula 1]

In [Formula 1], $R_1$ is an ester group; or an ether group, $R_2$ is a C1 to C10 alkyl group having at least one hydroxy group (—OH); or a C4 to C10 cycloalkyl group, and $R_3$ is hydrogen; or a C1 to C10 alkyl group.

[Formula B]

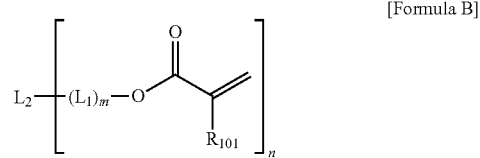

In [Formula B], $R_{101}$'s are the same as or different from each other, and are each independently hydrogen; or a C1 to C10 alkyl group, $L_1$ is a C1 to C10 alkylene group; —O—; —N(H)—; —C(=O)—; or —C(=O)O—, n is 2 or 3, when n is 2, $L_2$ is —N(H)C(=O)N(H)—; or —N(H)C(=O)-$L_3$-C(=O)N(H)—, when n is 3, $L_2$ is a trivalent C1 to C10 alkyl group which is unsubstituted or substituted with a hydroxy group, and at least one of $L_1$ is —N(H)—, $L_3$ is a direct bond; a C1 to C10 alkylene group; —O—; —N(H)—; —C(=O)—; or —C(=O)O—, m is an integer of 1 to 10, and when m and n are each 2 or more, two or more structures in the parenthesis are the same as or different from each other.

First, as the polarizer of the present invention, a polarizer well-known in the art, for example, a film composed of polyvinyl alcohol (PVA) including iodine or a dichroic dye may be used. The polarizer may be manufactured by dyeing iodine or a dichroic dye on a polyvinyl alcohol film, but the manufacturing method thereof is not particularly limited. In the present specification, the polarizer means a state in which a protective layer (or a protective film) is not included, and the polarizing plate means a state in which a polarizer and a protective layer (or a protective film) are included.

Meanwhile, when the polarizer is a polyvinyl alcohol-based film, the polyvinyl alcohol-based film may be used without particular limitation as long as the film includes a polyvinyl alcohol resin or a derivative thereof. In this case, examples of the derivative of the polyvinyl alcohol resin include a polyvinyl formal resin, a polyvinyl acetal resin, and the like, but are not limited thereto. Alternatively, as the polyvinyl alcohol-based film, it is also possible to use a commercially available polyvinyl alcohol-based film generally used in the manufacture of a polarizer in the art, for example, P30, PE30 and PE60 manufactured by Kuraray Co., Ltd., M3000 and M6000 manufactured by Japan Synthetic Co., Ltd., and the like. Meanwhile, the polyvinyl alcohol-based film may have a degree of polymerization of 1,000 to 10,000, preferably 1,500 to 5,000, but is not limited thereto. This is because when the degree of polymerization satisfies the range, molecules may freely move and be flexibly mixed with iodine or a dichroic dye, and the like.

Next, the protective layer of the present invention is formed using the radical curable composition in order to support and protect a polarizer, and may be formed by a well-known method in the art. For example, the method may be performed by applying the radical curable composition on one surface of a polarizer by a coating method well-known in the art, for example, spin coating, bar coating, roll coating, gravure coating, blade coating, and the like to form a protective layer, and then curing the composition by irradiating an active energy ray such as UV ray, visible light, electron beam, and X-ray. In this case, the irradiation method is not particularly limited, and may be performed, for example, by a method of irradiating UV ray of approximately 10 to 2,500 mJ/cm$^2$ using an UV irradiation device (fusion lamp, D bulb).

First, the first compound included in the radical curable composition according to the present invention is a component for implementing adhesive strength between a polarizer and a protective layer, and various compounds represented by the following [Formula 1] may be used.

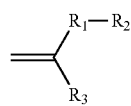

[Formula 1]

In [Formula 1], $R_1$ is an ester group; or an ether group, $R_2$ is a C1 to C10 alkyl group having at least one hydroxy group (—OH); or a C4 to C10 cycloalkyl group having at least one hydroxy group (—OH), and $R_3$ is hydrogen; or a C1 to C10 alkyl group. In this case, in $R_2$, the alkyl group may be a straight-chained or branched alkyl, and the hydroxy group (—OH) may be substituted at any position in an alkyl group; or a cycloalkyl group. That is, the hydroxy group may also be at the end of an alkyl group, and may also be in the middle of an alkyl group.

Meanwhile, the alkyl group described in the present invention includes both a straight-chained type and a branched type, and specific examples thereof include methyl, ethyl, i-propyl, n-propyl, i-butyl, n-butyl, t-butyl, n-pentyl, i-pentyl, and n-hexyl, and the like, but are not limited thereto.

In this case, the first compound may be one or more selected from the group consisting of compounds represented by the following [Formula 2] to [Formula 9], but is not limited thereto.

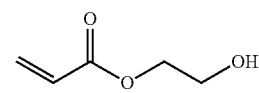

[Formula 2]

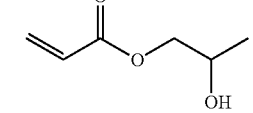

[Formula 3]

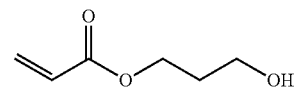

[Formula 4]

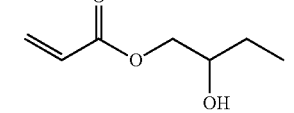

[Formula 5]

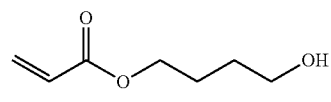

[Formula 6]

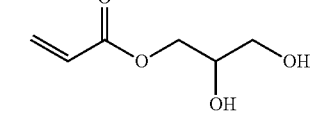

[Formula 7]

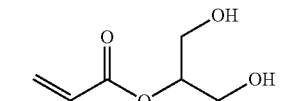

[Formula 8]

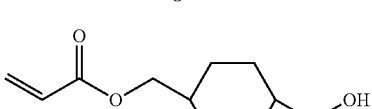

[Formula 9]

Meanwhile, the content of the first compound may be 40 to 85 parts by weight, 50 to 80 parts by weight, or 60 to 70 parts by weight, based on 100 parts by weight of the entire radical curable composition. When the content of the first compound satisfies the numerical range, it is possible to secure a stable adhesive strength even under high humid circumstances, and to secure sufficient heat resistance.

The second compound included in the radical curable composition according to an exemplary embodiment of the present specification is for improving storage modulus and heat resistance of the radical curable composition, and various compounds represented by Formula B may be used.

According to an exemplary embodiment of the present specification, in Formula B, $L_2$ is —N(H)C(=O)N(H)— when n is 2.

According to an exemplary embodiment of the present specification, in Formula B, when n is 3, $L_2$ is a trivalent diethylpentyl group; or a trivalent diethylpentyl group substituted with a hydroxy group.

In the present specification, the trivalent alkyl group means that there are three bonding positions in an alkyl group, that is, a divalent group. The above-described description on the alkyl group may be applied, except that the alkyl groups are each a trivalent group.

According to an exemplary embodiment of the present specification, in Formula B, $L_1$ is a methylene group; an ethylene group; an i-propyl group; —O—; —N(H)—; —C(=O)— or —C(=O)O—.

According to an exemplary embodiment of the present specification, in Formula B, $R_{101}$ is hydrogen; or a methyl group.

According to an exemplary embodiment of the present specification, provided is a polarizing plate including: a polarizer; and a protective layer formed on at least one surface of the polarizer, in which the protective layer is a cured product of a radical curable composition including: (A) a first compound represented by the following [Formula 1]; (B) a second compound obtained by reacting an aziridine compound with (meth)acrylic acid or a (meth)acrylate having a hydroxy group; and (C) a radical initiator.

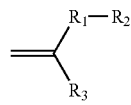

[Formula 1]

In [Formula 1], $R_1$ is an ester group; or an ether group, $R_2$ is a C1 to C10 alkyl group having at least one hydroxy group (—OH); or a C4 to C10 cycloalkyl group having at least one hydroxy group (—OH), and $R_3$ is hydrogen; or a C1 to C10 alkyl group.

Next, the second compound included in the radical curable composition according to the present invention is for improving elastic modulus and heat resistance of the radical curable composition, and is preferably obtained by reacting an aziridine compound with (meth)acrylic acid or a (meth)acrylate having a hydroxy group. The second compound has a structure formed by a ring-opening reaction between an aziridine compound and (meth)acrylic acid or an alcohol group.

In this case, the second compound serves to increase the degree of crosslinking because an amine group produced by a reaction between aziridine and (meth)acrylic acid or a hydroxy group forms a hydrogen bond with a polarizer, and further, the amine group is flexible and thus may improve storage modulus and simultaneously alleviate a curing shrinkage ratio generated when a multifunctional acrylate is cured, so that it is possible to effectively prevent the adhesive strength from deteriorating and improve the thermal shock stability.

More specifically, it is preferred that the aziridine compound is selected from the group consisting of compounds represented by the following [Formula 10] to [Formula 12].

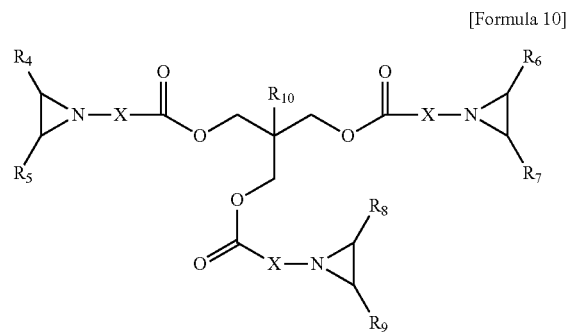

[Formula 10]

In this case, in [Formula 10], $R_4$ to $R_9$ are each independently a hydrogen atom; or a $C_{1\ to\ 12}$ alkyl group, $R_{10}$ is a hydrogen atom; or a substituted or unsubstituted $C_{1\ to\ 5}$ alkyl group, and X is a $C_{1\ to\ 5}$ alkylene group. Further, the alkyl group of $R_{10}$ includes both a straight-chained type and a branched type, and may be substituted with a hydroxy group; or an acrylate group, and the like, but is not limited thereto.

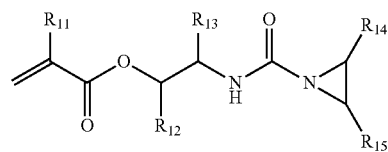

[Formula 11]

In [Formula 11], $R_{11}$ is a hydrogen atom; or a methyl group, and $R_{12}$ to $R_{15}$ are each independently a hydrogen atom; or a $C_{1\ to\ 12}$ alkyl group.

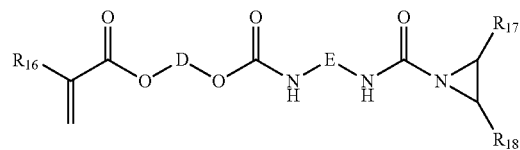

[Formula 12]

In [Formula 12], $R_{16}$ is a hydrogen atom; or a methyl group, $R_{17}$ and $R_{18}$ are each independently a hydrogen atom; or a $C_{1\ to\ 12}$ alkyl group, D is a $C_{2\ to\ 5}$ alkylene group; or a alkylene glycol having a repeating unit of 2 to 100, and E is a substituted or unsubstituted $C_{4\ to\ 20}$ alkylene group; or a $C_{6\ to\ 20}$ arylene group.

Meanwhile, the alkyl group described in the present invention includes both a straight-chained type and a branched type, and specific examples thereof include methyl, ethyl, i-propyl, n-propyl, i-butyl, n-butyl, t-butyl, n-pentyl, i-pentyl, a diethylpentyl group and n-hexyl, and the like, but are not limited thereto.

Further, examples of the polyalkylene glycol described in the present invention include ethylene glycol, propylene glycol, diethylene glycol, dipropylene glycol, triethylene glyclol, tripropylene glycol, and the like, but are not limited thereto.

The alkylene group described in the present invention means that there are two bonding positions in an alkyl group, that is, a divalent group. The above-described description on the alkyl group may be applied, except that the alkylene groups are each a divalent group.

The cycloalkyl group described in the present invention includes both a monocyclic form and a polycyclic form, and specific examples thereof include cyclopropyl, cyclobutyl, cyclopentyl, 3-methylcyclopentyl, 2,3-dimethylcyclopentyl, cyclohexyl, 3-methylcyclohexyl, 4-methylcyclohexyl, 2,3-dimethylcyclohexyl, 3,4,5-trimethylcyclohexyl, 4-tert-butylcyclohexyl, cycloheptyl, and cyclooctyl, but are not limited thereto.

The cycloalkylene group described in the present invention means that there are two bonding positions in a cycloalkyl group, that is, a divalent group. The above-described description on the cycloalkyl group may be applied, except that the cycloalkylene groups are each a divalent group.

Further, examples of the arylene group described in the present invention include phenylene, biphenylylene, naphthylene, terphenylene, triphenylylene, anthracenylene, and phenanthrenylene, and the like, but are not limited thereto.

Meanwhile, examples of a substituent which may be formed in the alkylene group of E include tolylene, chlorophenylene, hexamethylene, tetramethylene, isophorone, xylylene, diphenylmethane, and the like, but are not limited thereto.

Meanwhile, in [Formula 10], it is more preferred that $R_4$ to $R_9$ are each independently a hydrogen atom; or a methyl group, $R_{10}$ is a hydrogen atom; a methyl group; or a hydroxy methyl group, and X is an ethylene group, in [Formula 11], it is more preferred that $R_{11}$ is a hydrogen atom; or a methyl group, and $R_{12}$ to $R_{15}$ are each independently a hydrogen atom; or a methyl group, and in [Formula 12], it is more preferred that $R_{16}$ to $R_{18}$ are each independently a hydrogen atom; or a methyl group, D is a $C_{2\ to\ 5}$ alkylene group; or an alkylene glycol having a repeating unit of 2 to 100, and in this case, E is a substituted or unsubstituted $C_{4\ to\ 20}$ alkylene group; or a $C_{6\ to\ 20}$ arylene group.

In this case, as an example of Formula 10, it is possible to use trimethylolpropane-tris-(β-N-aziridinyl)propionate, pentaerythritol-tris-(β-N-aziridinyl)propionate, trimethylolpropane-tris-(2-methyl-1-aziridine propionate), and the like, but the example is not limited thereto.

In this case, as an example of Formula 11, 2-(2-methyl-aziridine-1-carboxamido)ethyl acrylate may be used, but the example is not limited thereto.

The (meth)acrylic acid means acrylic acid or methacrylic acid.

In this case, it is preferred that the (meth)acrylate having a hydroxy group is represented by the following [Formula 13].

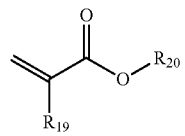

[Formula 13]

In [Formula 13], $R_{19}$ is a hydrogen group; or a methyl group, $R_{20}$ is a C1 to C10 alkyl group having at least one hydroxy group (—OH); or a C4 to C10 cycloalkyl group having at least one hydroxy group (—OH). In this case, in $R_{20}$, the alkyl group may be a straight-chained or branched alkyl, and the hydroxy group may be substituted at any position in an alkyl group or a cycloalkyl group. That is, the hydroxy group may also be at the end of an alkyl group, and may also be in the middle of an alkyl group.

Meanwhile, specific examples of the second compound may be represented by any one of the following [Formula 16] to [Formula 37], but are not limited thereto.

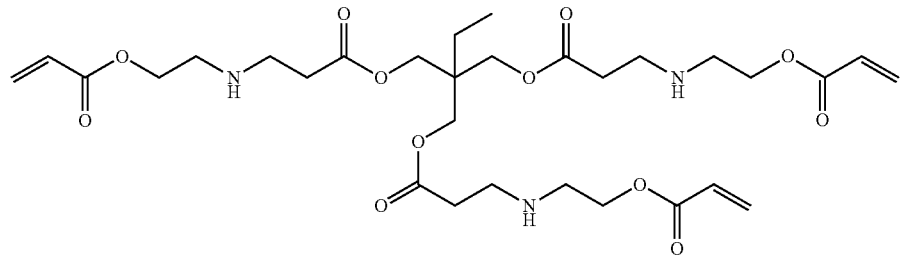

[Formula 16]

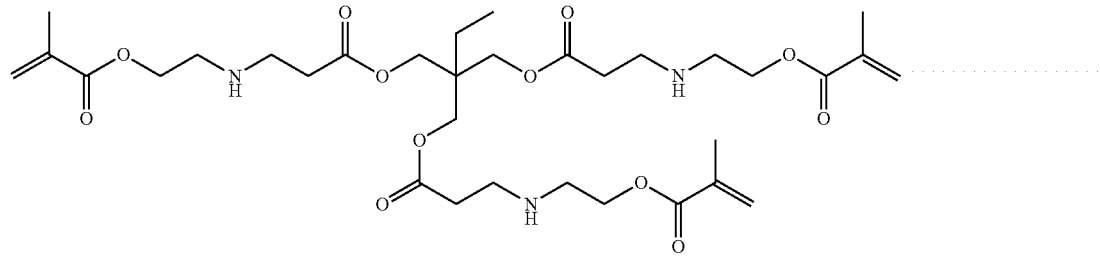

[Formula 17]

[Formula 18]
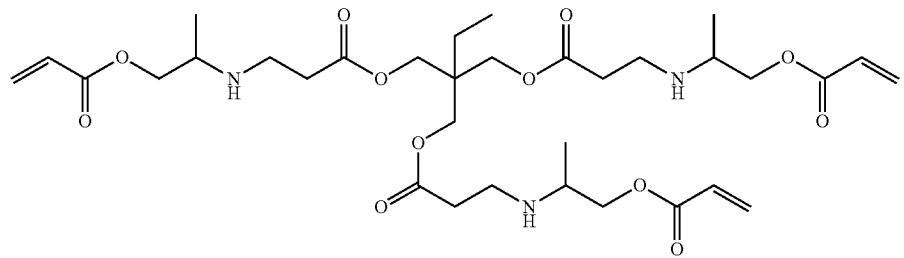
[Formula 19]
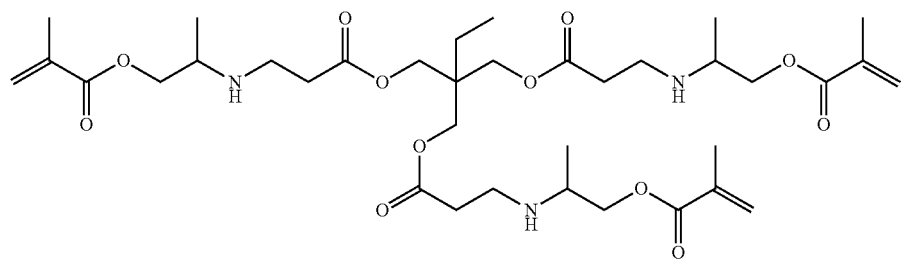
[Formula 20]
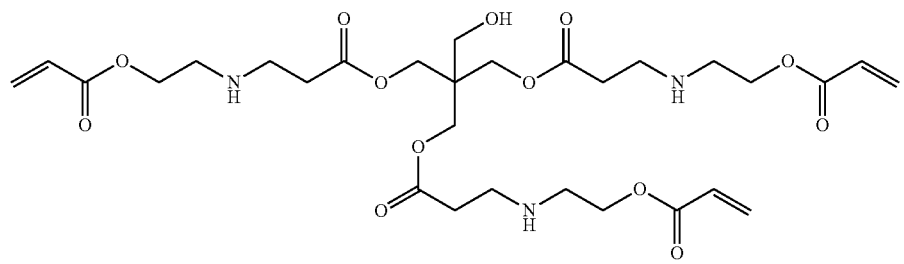
[Formula 21]
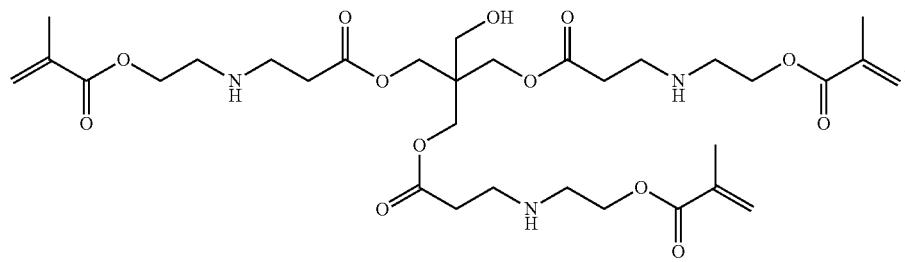
[Formula 22]
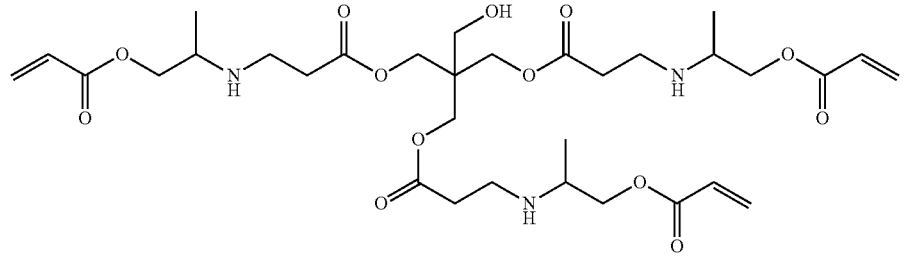

[Formula 23]
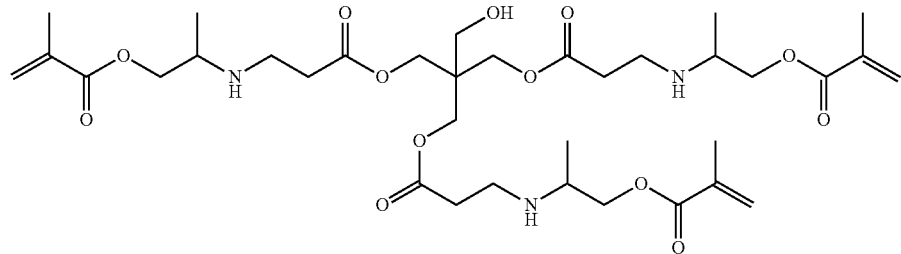
[Formula 24]
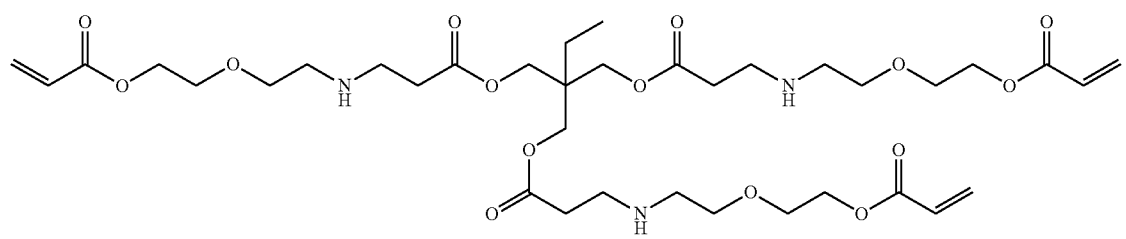
[Formula 25]
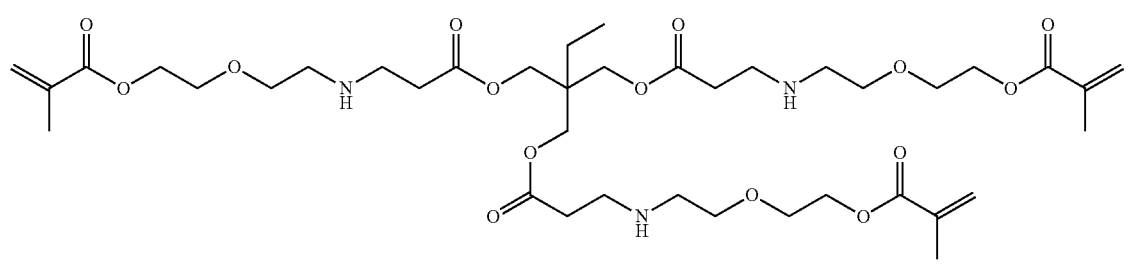
[Formula 26]
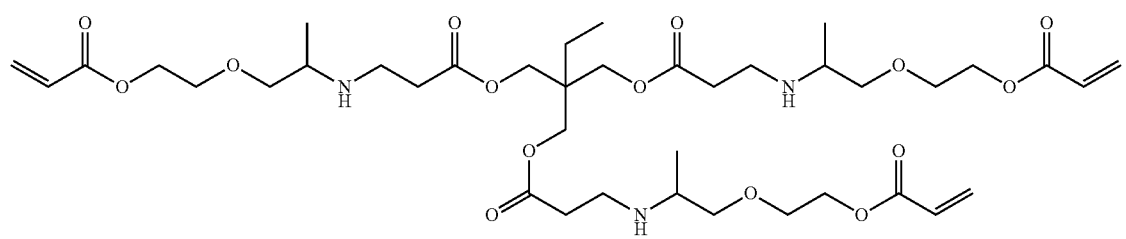
[Formula 27]
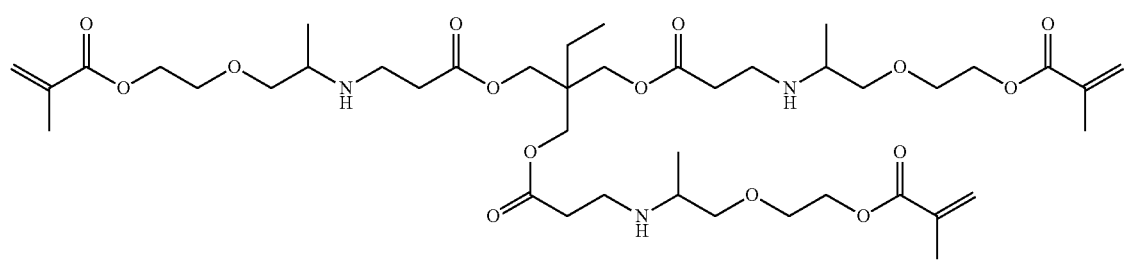
[Formula 28]
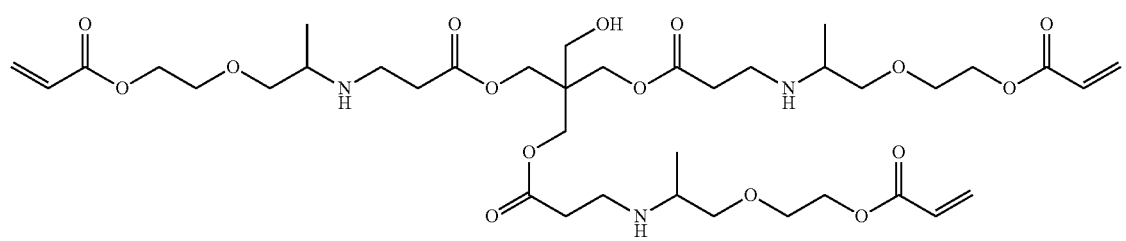

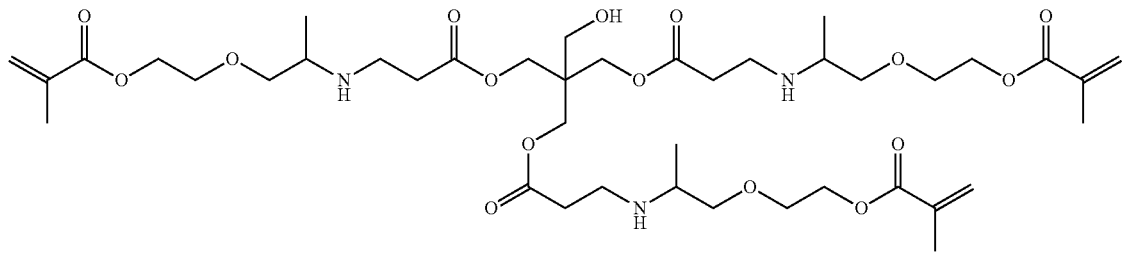
[Formula 29]

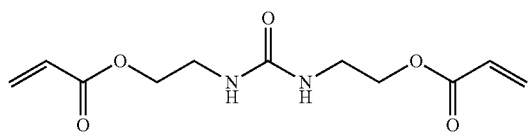
[Formula 30]

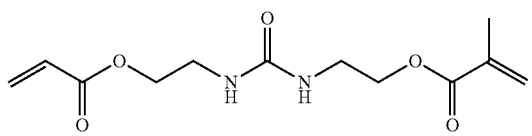
[Formula 31]

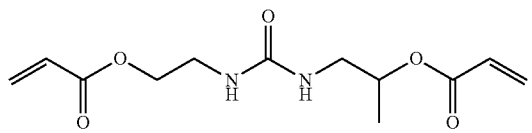
[Formula 32]

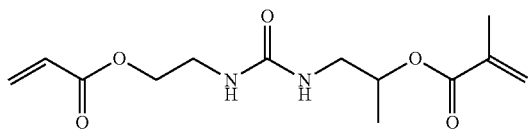
[Formula 33]

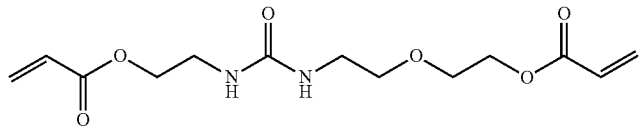
[Formula 34]

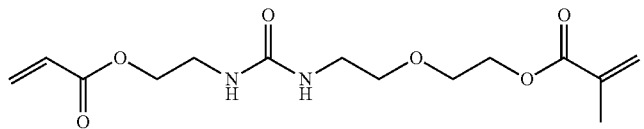
[Formula 35]

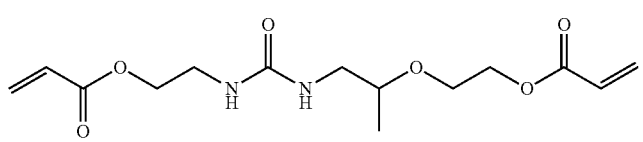
[Formula 36]

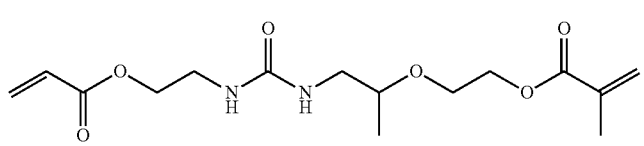
[Formula 37]

Meanwhile, the content of the second compound is preferably, for example, approximately 5 to 50 parts by weight, and may be, for example, approximately 10 to 40 parts by weight or 20 to 30 parts by weight, based on 100 parts by weight of the radical curable composition. When the content of the second compound satisfies the range, sufficient thermal shock stability is secured, and an appropriate glass transition temperature and an appropriate curing shrinkage ratio are maintained, and thus, adhesive strength is also excellent.

Meanwhile, between an aziridine compound and (meth)acrylic acid or a (meth)acrylate having a hydroxy group, which form the second compound, when the number of aziridine groups of the aziridine compound is defined as n, it is preferred that the molar ratio of the aziridine compound: (meth)acrylic acid or the (meth)acrylate having a hydroxy group is 1:n, and n is an integer.

That is, it is preferred that for the second compound, the aziridine group, which is present at the end of the aziridine compound that is a reactant, is reacted with both (meth)acrylic acid and an alcohol group. This is because when an aziridine group is left in the second compound produced, properties such as a glass transition temperature may deteriorate.

More specifically, the molar ratio of the aziridine compound represented by Formula 12 to (meth)acrylic acid is preferably 1:3. This is for preparing a (meth)acrylate compound having a new structure by reacting the aziridine group with the same equivalent weight of (meth)acrylic acid. Likewise, the molar ratio of the aziridine compound represented by Formula 13 or 14 to (meth)acrylic acid is preferably 1:1.

Meanwhile, the radical curable composition of the present invention may additionally include an acrylic monomer including an amine group as a third compound in order to implement low viscosity and improve adhesive strength.

More specifically, the third compound may be, for example, one or more selected from the group consisting of N,N-dimethyl acrylamide, acryloyl morpholine, N-isopropyl acrylamide, N,N-diethyl acrylamide, N,N-dimethylamino propylacrylamide, and 1,2,2,6,6-pentamethyl-4-piperidinyl methacrylate, but is not limited thereto.

Meanwhile, the content of the third compound is preferably, for example, 5 to 20 parts by weight, 5 to 15 parts by weight, or 10 to 15 parts by weight, based on 100 parts by weight of the radical curable composition. This is because when the content of the third compound satisfies the range, all of the adhesive strength, viscosity, and glass transition temperature are excellent.

More specifically, it is preferred that the radical curable composition of the present invention includes 40 to 85 parts by weight of the first compound, 5 to 50 parts by weight of the second compound, 5 to 20 parts by weight of the third compound, and 0.1 to 10 parts by weight of the radical initiator, based on 100 parts by weight of the entire radical curable composition.

Meanwhile, the radical initiator included in the radical curable composition according to the present invention is for improving the curing rate by promoting the radical polymerizability. In this case, radical initiators generally used in the art may be used without limitation as the radical initiator, and the radical initiator may be, for example, one or more selected from the group consisting of 1-hydroxy-cyclohexyl-phenyl-ketone, 2-hydroxy-2-methyl-1-phenyl-1-propanone, 2-hydroxy-1-[4-(2-hydroxyethoxy) phenyl]-2-methyl-1-propanone, methylbenzoylformate, oxy-phenyl-acetic acid-2-[2-oxo-2-phenyl-acetoxy-ethoxy]-ethyl ester, oxy-phenyl-acetic acid-2-[2-hydroxy-ethoxy]-ethyl ester, alpha-dimethoxy-alpha-phenylacetophenone, 2-benzyl-2-(dimethylamino)-1-[4-(4-morpholinyl) phenyl]-1-butanone, 2-methyl-1-[4-(methylthio)phenyl]-2-(4-morpholinyl)-1-propanone, diphenyl (2,4,6-trimethylbenzoyl)-phosphine oxide, phosphine oxide, and phenylbis(2,4,6-trimethylbenzoyl)-phosphineoxide. In particular, in the present invention, phenylbis(2,4,6-trimethylbenzoyl)-phosphineoxide may be preferably used.

In addition, it is preferred that the content of the radical initiator is, for example, 0.5 to 10 parts by weight, 1 to 5 parts by weight or 2 to 3 parts by weight, based on 100 parts by weight of the radical curable composition. This is because when the content of the radical initiator satisfies the numerical range, the composition may be smoothly cured.

Meanwhile, it is preferred that the radical curable composition according to the present invention has a viscosity of approximately 10 to 200 cP or 20 to 100 cP. When the viscosity of the radical curable composition satisfies the numerical range, there is an advantage in that the workability is excellent because the protective layer may be thinly formed, and the composition has low viscosity.

Meanwhile, it is preferred that the radical curable composition has a glass transition temperature of approximately 60° C. to 500° C. after curing, and the glass transition temperature may be, for example, 90° C. to 300° C. or 80° C. to 200° C. The protective layer, which is prepared by using the radical curable composition according to the present invention that has the glass transition temperature in the aforementioned numerical range, is advantageous in that heat resistance and water resistance are excellent. In the present specification, the curing means that the radical curable composition is cured by 80% or more by UV rays.

Furthermore, the radical curable composition has a storage modulus of 1,000 MPa to 5,000 MPa, which is measured by a dynamic mechanical analysis (DMA) method at 25° C. after curing, and the storage modulus is preferably approximately 2,000 MPa to 4,000 MPa. When the storage modulus of the composition satisfies the numerical range, excellent characteristics are exhibited in thermal shock stability.

Meanwhile, the radical curable composition according to the present invention forms a polarizer and a protective layer on at least one surface of the polarizer without a separate medium, and the protective layer formed by using the radical curable composition has a thickness of preferably 0.5 µm to 20 µm, and may have a thickness of, for example, 0.5 µm to 15 µm or 0.5 µm to 10 µm. This is because when the thickness of the protective layer satisfies the numerical range, thinning in thickness and reduction in weight of the polarizing plate manufactured may be achieved. When the thickness is less than 0.5 µm, thermal shock stability and curl characteristics of the polarizer are weak, and when the thickness is 20 µm or more, it is difficult to achieve thinning in thickness of the polarizing plate.

Meanwhile, the polarizing plate of the present invention may further include a protective film on one surface of the polarizer, if necessary. More specifically, in the polarizing plate of the present invention, when the protective layer is formed on one surface of the polarizer, a separate protective film may be attached to a surface opposite to the surface, on which a protective layer is formed, through an adhesive layer in order to support and protect the polarizer.

In this case, as the protective film, it is possible to use protective films of various materials generally known in the art, for example, a cellulose-based film, a polyethylene terephthalate (PET) film, a cycloolefin polymer (COP) film, an acrylic film, and the like without limitation. Among them, it is particularly preferred to use an acrylic film in consideration of optical characteristics, durability, economic feasibility, and the like, and the protective film may contain a (meth)acrylate-based resin. The film including a (meth)acrylate-based resin may be obtained by molding, for example, a molding material containing a (meth)acrylate-based resin as a main component by extrusion molding.

The acrylic protective film may be a film including a copolymer including an alkyl(meth)acrylate-based unit and a styrene-based unit, and an aromatic resin having a carbonate portion in the main chain, or a film including an alkyl(meth)acrylate-based unit, a styrene-based unit, a 3- to 5-membered heterocyclic unit substituted with at least one carbonyl group, and a vinyl cyanide unit.

Alternatively, the acrylic protective film may be a film including a (meth)acrylate-based resin having an aromatic ring. Examples of the (meth)acrylate-based resin having an aromatic ring include a resin composition described in Korean Patent Application Laid-Open No. 10-2009-0115040, the resin composition including: (a) a (meth)acrylate-based unit including one or more (meth)acrylate-based derivatives; (b) an aromatic unit having a chain with a hydroxy group-containing portion and an aromatic portion; and (c) a styrene-based unit including one or more styrene-based derivatives. The units of (a) to (c) may also be each included in the form of a separate copolymer in the resin composition, and two or more units among the units of (a) to (c) may also be included in the form of one copolymer in the resin composition.

Alternatively, the acrylic protective film may be a film including an acrylic resin having a lactone ring structure. Specific examples of the (meth)acrylate-based resin having a lactone ring structure include (meth)acrylate-based resins having a lactone ring structure, which are described in, for example, the official gazettes of Japanese Patent Application Laid-Open No. 2000-230016, Japanese Patent Application Laid-Open No. 2001-151814, Japanese Patent Application Laid-Open No. 2002-120326, and the like.

The method of preparing the acrylic protective film is not particularly limited, and for example, the acrylic protective film may be prepared by sufficiently mixing a (meth)acrylate-based resin, other polymers, additives, and the like by any appropriate mixing method to prepare a thermoplastic resin composition, and then film-molding the thermoplastic resin composition, or by preparing a (meth)acrylate-based resin, other polymers, additives, and the like as a separate solution, mixing the mixture to form a uniform mixture solution, and then film-molding the mixture.

The thermoplastic resin composition is, for example, prepared by pre-blending the film raw material by any appropriate mixer such as an omni-mixer, and then extrusion-kneading the obtained mixture. In this case, the mixer used in extrusion-kneading is not particularly limited, and it is possible to use any appropriate mixer such as, for example, an extruder such as a single-screw extruder and a twin-screw extruder or a pressure kneader.

Examples of the film-molding method include any appropriate film-molding method such as a solution cast method (a solution casting method), a melt extrusion method, a calendaring method, and a compression molding method. Among the film-molding methods, a solution cast method (a solution casting method) and a melt extrusion method are preferred.

Examples of solvents used in the solution cast method (a solution casting method) include: aromatic hydrocarbons such as benzene, toluene, and xylene; aliphatic hydrocarbons such as cyclohexane and decaline; esters such as ethyl acetate and butyl acetate; ketones such as acetone, methyl ethyl ketone, and methyl isobutyl ketone; alcohols such as methanol, ethanol, isopropanol, butanol, isobutanol, methyl cellosolve, ethyl cellosolve, and butyl cellosolve; ethers such as tetrahydrofuran and dioxane; halogenated hydrocarbons such as dichloromethane, chloroform, and carbon tetrachloride; dimethyl formamide; dimethyl sulfoxide, and the like. These solvents may be used alone or in combination of two or more thereof.

Examples of an apparatus for performing the solution cast method (a solution casting method) include a drum-type casting machine, a band-type casting machine, a spin coater and the like. Examples of the melt extrusion method include a T-die method, an inflation method, and the like. The molding temperature is preferably 150° C. to 350° C., and more preferably 200° C. to 300° C.

When a film is molded by the T-die method, a T-die is mounted on a front end portion of a publicly-known single- or twin-screw extruder, and a film extruded in a film form is wound, thereby obtaining a roll-shaped film. In this case, the film may also be uniaxially stretched by appropriately adjusting the temperature of a winding roll to stretch the film in an extrusion direction. Further, simultaneous biaxial stretching, successive biaxial stretching, and the like may also be performed by stretching the film in a direction perpendicular to an extrusion direction.

The acrylic protective film may be any one of an unstretched film or a stretched film. The acrylic film may be a uniaxially stretched film or a biaxially stretched film when the acrylic film is a stretched film, and the acrylic film may be a simultaneously biaxially stretched film or a successively biaxially stretched film when the acrylic film is the biaxially stretched film. When the acrylic film is biaxially stretched, mechanical strength of the film is improved, so that performance of the film is improved. The acrylic film is mixed with other thermoplastic resins, so that the acrylic film may suppress an increase in phase difference and maintain optical isotropy even when the acrylic film is stretched.

A stretching temperature is preferably within a range near a glass transition temperature of a thermoplastic resin composition as the film raw material, preferably (a glass transition temperature−30° C.) to (a glass transition temperature+100° C.), and more preferably (a glass transition temperature−20° C.) to (a glass transition temperature+80° C.). When the stretching temperature is less than (a glass transition temperature−30° C.), there is a concern in that a sufficient stretching magnification ratio may not be obtained. In contrast, when the stretching temperature is more than (a glass transition temperature+100° C.), there is a concern in that the flowing (flow) of the resin composition occurs, and thus, stable stretching may not be performed.

A stretching magnification ratio defined as an area ratio is preferably 1.1 to 25 times and more preferably 1.3 to 10 times. When the stretching magnification ratio is less than 1.1 times, there is a concern in that the stretching magnification does not lead to an improvement in toughness, which is accompanied by stretching. When the stretching magnification ratio is more than 25 times, there is a concern in that effects obtained by increasing the stretching magnification ratio are not acknowledged.

The stretching speed is preferably 10 to 20,000%/min, and more preferably 100 to 10,000%/min in one direction. When the stretching speed is less than 10%/min, it takes a rather long time to obtain a sufficient stretching magnification ratio, so that there is a concern in that the manufacturing costs may be increased. When the stretching speed is more than 20,000%/min, there is a concern in that fracture of the stretched film and the like may be incurred.

In order to stabilize optical isotropy or mechanical properties of an acrylic protective film, the acrylic protective film may be subjected to a heat treatment (annealing) and the like after the stretching treatment. Conditions for the heat treatment are not particularly limited, and any appropriate conditions known in the art may be adopted.

Meanwhile, surface treatment may be performed on the acrylic protective film in order to improve adhesive strength, if necessary, and it is possible to perform at least one surface treatment, which is selected from the group consisting of an alkali treatment, a corona treatment, and a plasma treatment, on at least one surface of the optical film.

Meanwhile, adhesion between the polarizer and the protective film may be performed by coating an adhesive on a surface of the polarizer or the protective film using a roll coater, a gravure coater, a bar coater, a knife coater, a capillary coater, or the like, and then heat-laminating the polarizer and the protective film using a laminated roll, or pressing the polarizer and the protective film at normal temperature to laminate the polarizer and the protective film or irradiating UV rays on the polarizer and the protective film after laminating the polarizer and the protective film, and the like. Meanwhile, as the adhesive, various adhesives for a polarizing plate used in the art, for example, a polyvinyl alcohol-based adhesive, a polyurethane-based adhesive, an acrylic adhesive, a cationic or radical-based adhesive, and the like may be used without limitation.

Meanwhile, the polarizing plate of the present invention may include an adhesion layer on the upper portion of the protective layer, if necessary, in order to be attached to a display device panel or an optical film such as a phase difference film.

In this case, the adhesion layer may be formed using various adhesives well-known in the art, and the type thereof is not particularly limited. For example, the adhesion layer may be formed by using a rubber-based tackifier, an acrylic tackifier, a silicone-based tackifier, a urethane-based tackifier, a polyvinyl alcohol-based tackifier, a polyvinyl pyrrolidone-based tackifier, a polyacrylamide-based tackifier, a cellulose-based tackifier, a vinylalkyl ether-based tackifier, and the like. Among them, it is particularly preferred to use an acrylic tackifier in consideration of transparency, heat resistance, and the like.

Meanwhile, the adhesion layer may also be formed by a method of applying a tackifier on the upper portion of the protective layer, and may also be formed by a method of attaching an adhesion sheet, which is prepared by applying a tackifier on a release sheet, and then drying the tackifier, on the upper portion of the protective layer.

The polarizing plate of the present invention as described above may be usefully applied to an optical device such as a liquid crystal display device. The optical device may be, for example, a liquid crystal display device including a liquid crystal panel and polarizing plates each provided on both surfaces of the liquid crystal panel, and in this case, at least one of the polarizing plates may be the polarizing plate according to the present invention. In this case, the type of liquid crystal panel included in the liquid crystal display is not particularly limited. For example, publicly-known panels, such as a passive matrix-type panel such as a twisted nematic (TN), super twisted nematic (STN), ferroelectric (F) or polymer dispersed (PD) panel; an active matrix-type panel such as a two terminal or three terminal panel; and an in-plane switching (IPS) panel and a vertical alignment (VA) panel, may be all applied without being limited in type. Furthermore, other configurations constituting the liquid crystal display device, for example, the kind of upper and lower substrates (for example, a color filter substrate or an array substrate) is not particularly limited, and a configuration publicly-known in the art may be adopted without limitation.

[Mode for Invention]

Hereinafter, the present invention will be described in detail with reference to specific examples.

PREPARATION EXAMPLE 1

Acrylic Protective Film

A resin composition in which poly(N-cyclohexylmaleimide-co-methylmethacrylate), a styrene-maleic anhydride copolymer resin, and a phenoxy-based resin were uniformly mixed at a weight ratio of 100:2.5:5 was supplied to a 24Φ extruder that was substituted with nitrogen from a raw material hopper to the extruder, and melted at 250° C. to prepare a raw material pellet.

As the phenoxy-based resin, PKFE (Mw=60,000, Mn=16,000, and Tg=95° C.) manufactured by InChemRez® Co., Ltd. was used; as the styrene-maleic anhydride copolymer resin, Dylaeck 332 containing 85 wt % of styrene and 15 wt % of anhydrous maleic anhydride was used; and as the poly(N-cyclohexylmaleimide-co-methylmethacrylate) resin, a poly(N-cyclohexylmaleimide-co-methylmethacrylate) resin in which the content of N-cyclohexylmaleimide was 6.5 wt % as a result of an NMR analysis was used.

The obtained raw material pellet was dried under vacuum, melted at 260° C. by using the extruder, and passed through a coat hanger-type T-die, and then passed through a chrome-coated casting roll and a dry roll and the like to prepare a film having a thickness of 150 μm. This film was stretched at a ratio of 170% using a difference in speed between rolls in an MD direction at 125° C. by using a pilot stretching device to prepare an acrylic film.

The acrylic film prepared through the above-described process was subjected to corona treatment, and one side of the acrylic film was then coated, by using a #7 bar, with a primer composition, in which 20 parts by weight of an oxazoline crosslinking agent (WS700 manufactured by Nippon Shokubai Co., Ltd.) was added to a primer composition having 10 wt % of a solid component which was prepared by diluting CK-PUD-F (Chokwang urethane dispersion) with pure water, and then the the acrylic film was stretched at 130° C. in a TD direction by 190% using a tenter to finally prepare an acrylic protective film having a primer layer thickness of 400 nm.

PREPARATION EXAMPLE 2

Preparation of Radical Curable Composition (1) Radical Curable Composition A 3 parts by weight of phenylbis(2,4,6-trimethylbenzoyl)-phosphineoxide as a radical initiator was added to 100 parts by weight of a radical curable composition including 60 parts by weight of 2-hydroxyethylacrylate and 40 parts by weight of 9-(((3-((1-(acryloyloxy)propan-2-yl)amino)propanoyl)oxy)methyl)-9-ethyl-2,16-dimethyl-6,12-dioxo-7,11-dioxa-3,15-diazaheptadecane-1,17-diyl diacrylate (Formula 18), thereby preparing radical curable composition A.

(2) Radical Curable Composition B 3 parts by weight of phenylbis(2,4,6-trimethylbenzoyl)-phosphineoxide as a radical initiator was added to 100 parts by weight of a radical curable composition including 60 parts by weight of 2-hydroxyethylacrylate, 20 parts by weight of 9-(((3-((1-(acryloyloxy)propan-2-yl)amino)propanoyl)oxy)methyl)-9-ethyl-2,16-dimethyl-6,12-dioxo-7,11-dioxa-3,15-diazaheptadecane-1,17-diyl diacrylate (Formula 18), and 20 parts by weight of 1-(3-(2-(acryloyloxy)ethyl)ureido)propan-2-yl acrylate (Formula 32), thereby preparing radical curable composition B.

(3) Radical Curable Composition C 3 parts by weight of phenylbis(2,4,6-trimethylbenzoyl)-phosphineoxide as a radical initiator was added to 100 parts by weight of a radical curable composition including 60 parts by weight of 2-hydroxyethylacrylate and 40 parts by weight of 1-(3-(2-(acryloyloxy)ethyl)ureido)propan-2-yl acrylate (Formula 32), thereby preparing radical curable composition C.

(4) Radical Curable Composition D 3 parts by weight of phenylbis(2,4,6-trimethylbenzoyl)-phosphineoxide as a radical initiator was added to 100 parts by weight of a radical curable composition including 60 parts by weight of 2-hydroxyethylacrylate, 30 parts by weight of 1-(3-(2-(acryloyloxy)ethyl)ureido)propan-2-yl acrylate (Formula 32), and 10 parts by weight of 1,2,2,6,6-pentamethyl-4-piperidinyl methacrylate, thereby preparing radical curable composition D.

(5) Radical Curable Composition E 3 parts by weight of phenylbis(2,4,6-trimethylbenzoyl)-phosphineoxide as a radical initiator was added to 100 parts by weight of a radical curable composition including 60 parts by weight of 2-hydroxyethylacrylate, 30 parts by weight of 1-(3-(2-(acryloyloxy)ethyl)ureido)propan-2-yl acrylate (Formula 32), and 10 parts by weight of N,N-dimethyl acrylamide, thereby preparing radical curable composition E.

(6) Radical Curable Composition F 3 parts by weight of phenylbis(2,4,6-trimethylbenzoyl)-phosphineoxide as a radical initiator was added to 100 parts by weight of a radical curable composition including 60 parts by weight of 4-hydroxybutylacrylate, 30 parts by weight of 1-(3-(2-(acryloyloxy)ethyl)ureido)propan-2-yl acrylate (Formula 32), and 10 parts by weight of N,N-dimethyl acrylamide, thereby preparing radical curable composition F.

(7) Radical Curable Composition G 3 parts by weight of phenylbis(2,4,6-trimethylbenzoyl)-phosphineoxide as a radical initiator was added to 100 parts by weight of a radical curable composition including 40 parts by weight of 2-hydroxyethylacrylate and 60 parts by weight of 9-(((3-((1-(acryloyloxy)propan-2-yl)amino)propanoyl)oxy)methyl)-9-ethyl-2,16-dimethyl-6,12-dioxo-7,11-dioxa-3,15-diazaheptadecane-1,17-diyl diacrylate (Formula 18), thereby preparing radical curable composition G.

(8) Radical Curable Composition H 3 parts by weight of phenylbis(2,4,6-trimethylbenzoyl)-phosphineoxide as a radical initiator was added to 100 parts by weight of a radical curable composition including 40 parts by weight of 2-hydroxyethylacrylate and 60 parts by weight of 1-(3-(2-(acryloyloxy)ethyl)ureido)propan-2-yl acrylate (Formula 32), thereby preparing radical curable composition H.

(9) Radical Curable Composition I 3 parts by weight of phenylbis(2,4,6-trimethylbenzoyl)-phosphineoxide as a radical initiator was added to 100 parts by weight of a radical curable composition including 70 parts by weight of 2-hydroxyethylacrylate and 30 parts by weight of trimethylolpropane triacrylate (TMPTA), thereby preparing radical curable composition I.

(10) Radical Curable Composition J 3 parts by weight of phenylbis(2,4,6-trimethylbenzoyl)-phosphineoxide as a radical initiator was added to 100 parts by weight of a radical curable composition including 70 parts by weight of 2-hydroxyethylacrylate and 30 parts by weight of pentaerythritol triacrylate (PETA), thereby preparing radical curable composition J.

(11) Radical Curable Composition K 3 parts by weight of phenylbis(2,4,6-trimethylbenzoyl)-phosphineoxide as a radical initiator was added to 100 parts by weight of a radical curable composition including 70 parts by weight of 2-hydroxyethylacrylate and 30 parts by weight of dipentaerythritol hexaacrylate (DPHA), thereby preparing radical curable composition K.

EXAMPLE 1

Radical curable composition A was applied to a primer layer of the acrylic protective film prepared in Preparation Example 1 by using a dropper, the film was laminated on one surface of a PVA polarizer, and conditions were set such that the thickness of a final adhesive layer was 1 μm to 2 μm, and then the film was allowed to pass through a laminator (5 m/min). Thereafter, a UV ray of 900 mJ/cm² was irradiated on the surface, on which the acrylic protective film was laminated, by using an ultraviolet irradiation device (Fusion Lamp, D Bulb) to prepare a polarizing plate including a protective film on one surface of a polarizer.

Next, radical curable composition A was applied to the other surface of the surface of the polarizer (PVA device) of the polarizing plate prepared as described above, on which a protective film is laminated, a PET film having release force was laminated thereon, conditions were set such that the thickness of the final protective layer was 5 to 6 μm, and then the film was allowed to pass through a laminator (5 m/min). Thereafter, a UV ray of 900 mJ/cm² was irradiated on the surface, on which the release PET film was laminated, by using an ultraviolet irradiation device (Fusion Lamp, D Bulb), and the PET film was removed to prepare a polarizing plate including a protective film on one surface of the polarizer and a protective layer on the other surface thereof. The polarizing plate was prepared under a constant temperature and constant humidity environment of a temperature of 20° C. and a humidity of 50%.

EXAMPLE 2

A polarizing plate was manufactured in the same manner as in Example 1, except that radical curable composition B was used instead of radical curable composition A.

EXAMPLE 3

A polarizing plate was manufactured in the same manner as in Example 1, except that radical curable composition C was used instead of radical curable composition A.

EXAMPLE 4

A polarizing plate was manufactured in the same manner as in Example 1, except that radical curable composition D was used instead of radical curable composition A.

EXAMPLE 5

A polarizing plate was manufactured in the same manner as in Example 1, except that radical curable composition E was used instead of radical curable composition A.

EXAMPLE 6

A polarizing plate was manufactured in the same manner as in Example 1, except that radical curable composition F was used instead of radical curable composition A.

COMPARATIVE EXAMPLE 1

A polarizing plate was manufactured in the same manner as in Example 1, except that radical curable composition G was used instead of radical curable composition A.

COMPARATIVE EXAMPLE 2

A polarizing plate was manufactured in the same manner as in Example 1, except that radical curable composition H was used instead of radical curable composition A.

COMPARATIVE EXAMPLE 3

A polarizing plate was manufactured in the same manner as in Example 1, except that radical curable composition I was used instead of radical curable composition A.

COMPARATIVE EXAMPLE 4

A polarizing plate was manufactured in the same manner as in Example 1, except that radical curable composition J was used instead of radical curable composition A.

COMPARATIVE EXAMPLE 5

A polarizing plate was manufactured in the same manner as in Example 1, except that radical curable composition K was used instead of radical curable composition A.

EXPERIMENTAL EXAMPLE

1. Measurement of Glass Transition Temperature

The glass transition temperatures of the protective layers of the polarizing plates prepared in Examples 1 to 6 and Comparative Examples 1 to 5 were measured, and are shown in the following [Table 1]. Specifically, the protective layer of the polarizing plate prepared under the curing conditions as described above was separated, and then the glass transition temperature value at the second run was measured by using a differential scanning calorimeter (DSC manufactured by Mettler Co., Ltd.) was used to increase the temperature to −30° C. to 200° C.

2. Measurement of Storage Modulus

The radical curable composition each prepared in the Preparation Examples was applied between the release PETs, conditions were set such that the final thickness was 80 μm, and then the film was allowed to pass through a laminator, and then curing was conducted under the curing conditions which was the same as in the Examples. And then, the cured product separated from the release PET was cut into a width of 5.3 mm and a length of 50 mm, and the storage modulus was measured by using DMA (manufactured by TA Instruments) to increase the temperature to −40° C. to 160° C. Among them, the results of the storage moduli at 25° C. are shown in the following [Table 1].

3. Evaluation of Adhesive Strength

Each of the radical curable compositions prepared in the Examples and the Comparative Examples was applied on the polarizer (PVA device), the polarizer (PVA device) was laminated thereon to be allowed to pass through a laminator, and then an ultraviolet irradiation device (Fusion Lamp, D Bulb) was used to irradiate an ultraviolet ray of 900 mJ/cm$^2$ thereon, thereby preparing a peeling strength sample composed of a polarizer/a protective layer/a polarizer. The prepared sample was cut into a width of 20 mm and a length of 100 mm, and then peeling strength was measured while peeling at a speed of 300 mm/min and an angle of 90° by using a texture analyzer (TA-XT Plus manufactured by Stable Micro Systems, Ltd.), and the case where the peeling strength was more than 1.0 N/cm, the case where the peeling strength was 0.5 N/cm to 1.0 N/cm, and the case where the peeling strength was less than 0.5 N/cm were indicated as excellent, good, and poor, respectively. The results are shown in the following [Table 1].

4. Evaluation of Thermal Shock Properties

Each of the polarizing plates prepared in Examples 1 to 6 and Comparative Examples 1 to 5 was laminated on a glass substrate, and left to stand at −40° C. for 30 minutes, and then left to stand at 80° C. for 30 minutes, repeatedly 100 times. And then, it was evaluated with the unaided eye whether the appearance of the polarizing plate was modified. In the appearance of the polarizing plate, the case where cracks with a size of 2 mm or less were generated only on the end portion, the case where only cracks with a short line of 5 mm or more were confirmed on portions other than the end portion, and the case where a plurality of cracks was generated on the entire surface of the polarizing plate were indicated as excellent, good, and poor, respectively. The results are shown in the following [Table 1].

TABLE 1

| Classification | First compound | Second composition (part by weight) | Third composition (part by weight) | Radical initiator | Tg (° C.) | Storage modulus (MPa) | Adhesive strength | Thermal shock stability |
| --- | --- | --- | --- | --- | --- | --- | --- | --- |
| Example 1 | 2-HEA (60) | Formula 18 (40) | — | Phenylbis(2,4,6-trimethylbenzoyl)-)-phosphineoxide | 65 | 2300 | Excellent | Excellent |
| Example 2 | 2-HEA (60) | Formula 18 (20) Formula 32 (20) | — | | 70 | 2500 | Excellent | Excellent |
| Example 3 | 2-HEA (60) | Formula 32 (40) | | | 75 | 2900 | Good | Excellent |
| Example 4 | 2-HEA (60) | Formula 32 (30) | PMPMA (10) | | 80 | 3000 | Excellent | Excellent |
| Example 5 | 2-HEA (60) | Formula 32 (30) | DMAA(10) | | 80 | 3000 | Excellent | Excellent |
| Example 6 | 4-HBA (60) | Formula 32 (30) | DMAA (10) | | 60 | 1500 | Excellent | Good |
| Comparative Example 1 | 2-HEA (40) | Formula 18 (60) | — | | 85 | 3000 | Poor | Excellent |
| Comparative Example 2 | 2-HEA (40) | Formula 32 (60) | — | | 95 | 3500 | Poor | Excellent |
| Comparative Example 3 | 2-HEA (75) | TMPTA (25) | — | | 62 | 2700 | Poor | Good |

TABLE 1-continued

| Classification | First compound | Second composition (part by weight) | Third composition (part by weight) | Radical initiator | Tg (° C.) | Storage modulus (MPa) | Adhesive strength | Thermal shock stability |
|---|---|---|---|---|---|---|---|---|
| Comparative Example 4 | 2-HEA (75) | PETA (25) | | — | 60 | 2400 | Poor | Good |
| Comparative Example 5 | 2-HEA (25) | DPHA (75) | | — | 58 | 2300 | Poor | Good |

2-HEA: 2-hydroxyethylacrylate
4-HBA: 4-hydroxybutylacrylate
Formula18;9-(((3-((1-(acryloyloxy)propan-2-yl)amino)propanoyl)oxy)methyl)-9-ethyl-2,16-dimethyl-6,12-dioxo-7,11-dioxa-3-15-diazaheptadecane-1,17-diyl diacrylate
Formula 32: 1-(3-(2-(acryloyloxy)ethyl)ureido)propan-2-yl acrylate
TMPTA: Trimethylolpropane triacrylate
PETA: Pentaerythritol triacrylate
DPHA: Dipentaerythritol hexaacrylate
PMPMA: 1,2,2,6,6-pentamethyl-4-piperidinyl methacrylate
DMAA: N,N-dimethyl acrylamide Even though the exemplary embodiments of the present invention have been described in detail, the right scope of the present invention is not limited thereto, and it will be obvious to a person with ordinary skill in the art that various modifications and alterations are possible without departing from the technical spirit of the present invention described in the claims.

The invention claimed is:

1. A polarizing plate comprising:
a polarizer; and
a protective layer formed on at least one surface of the polarizer,
wherein the protective layer is a cured product of a radical curable composition comprising:
(A) a first compound represented by the following Formula 1;
(B) a second compound represented by the following Formula B; and
(C) a radical initiator,

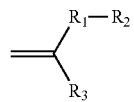
[Formula 1]

wherein in Formula 1:
$R_1$ is an ester group; or an ether group, $R_2$ is a C1 to C10 alkyl group having at least one hydroxy group (—OH); or a C4 to C10 cycloalkyl group having at least one hydroxy group (—OH), and $R_3$ is hydrogen; or a C1 to C10 alkyl group,

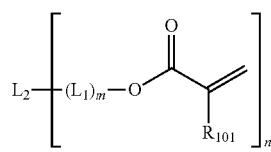
[Formula B]

wherein in Formula B:
$R_{101}$'s are the same as or different from each other, and are each independently hydrogen; or a C1 to C10 alkyl group, $L_1$ is a C1 to C10 alkylene group; —O—; —N(H)—; —C(=O)—; or —C(=O)O—, n is 2 or 3, when n is 2, $L_2$ is —N(H)C(=O)N(H)—; or —N(H)C(=O)-$L_3$-C(=O)N(H)—, when n is 3, $L_2$ is a trivalent C1 to C10 alkyl group which is unsubstituted or substituted with a hydroxy group, and at least one of $L_1$ is —N(H)—, $L_3$ is a direct bond; a C1 to C10 alkylene group; —O—; —N(H)—; —C(=O)—; or —C(=O)O—, m is an integer of 1 to 10, and when m and n are each 2 or more, two or more structures in the parenthesis are the same as or different from each other.

2. The polarizing plate of claim 1, wherein the first compound is one or more selected from the group consisting of compounds represented by the following Formula 2 to Formula 9:

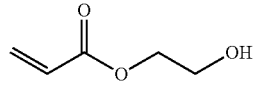
[Formula 2]

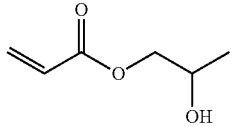
[Formula 3]

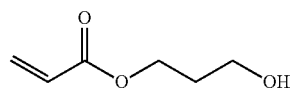
[Formula 4]

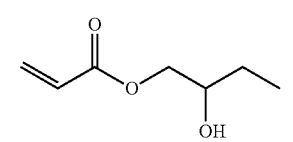
[Formula 5]

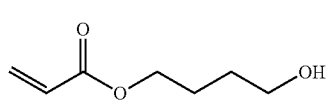
[Formula 6]

[Formula 7]
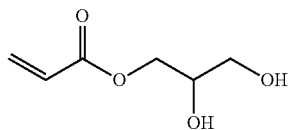
[Formula 8]
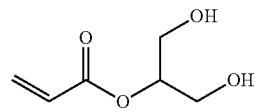
[Formula 9]
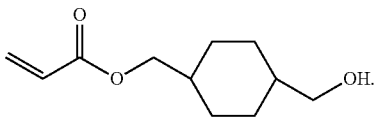
3. The polarizing plate of claim 1, wherein the second compound is represented by any one of the following Formula 16 to Formula 37:
[Formula 16]
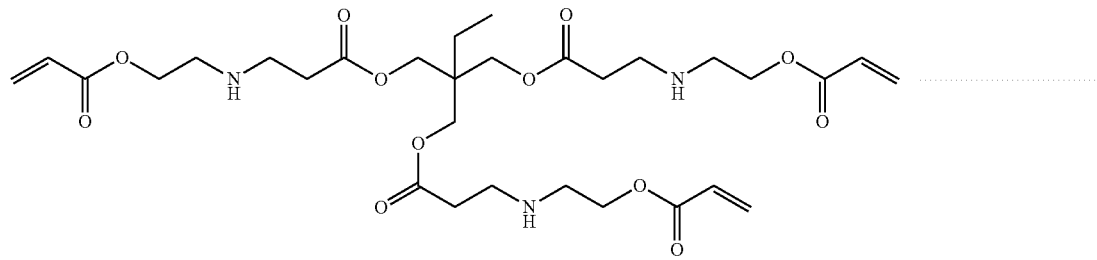
[Formula 17]
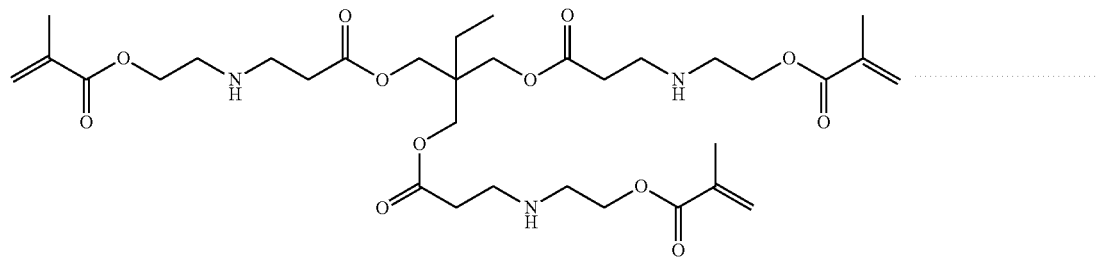
[Formula 18]
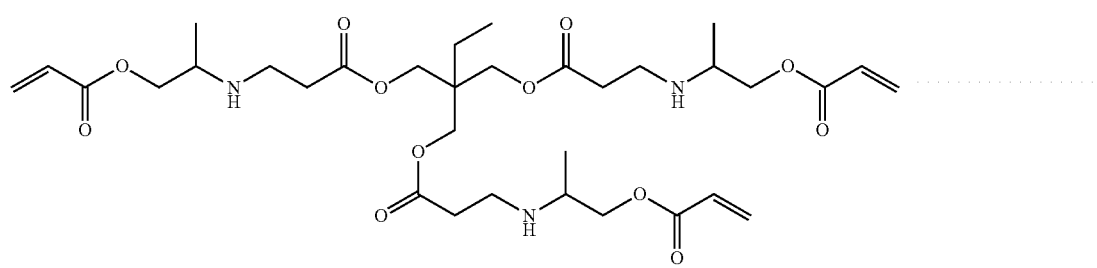
[Formula 19]
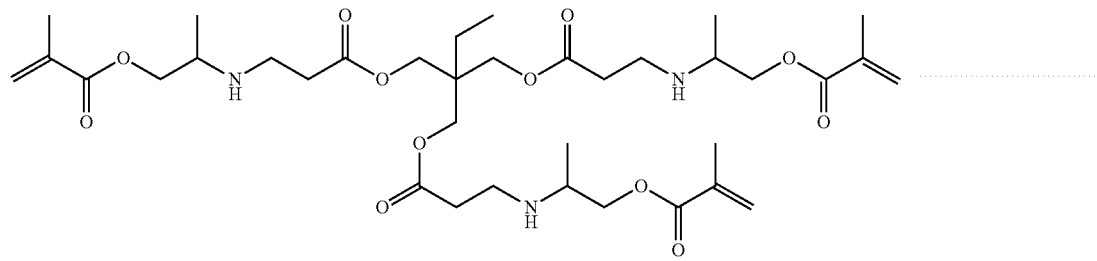

[Formula 20]
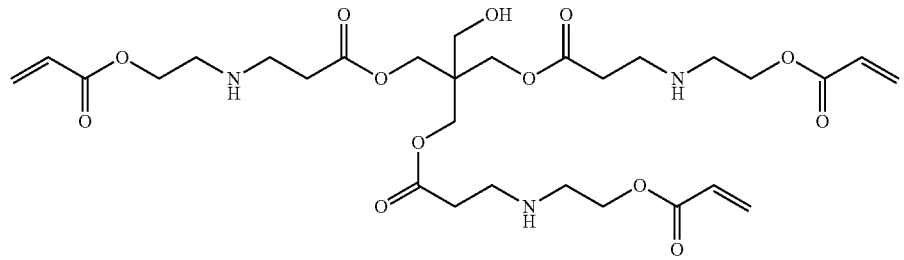
[Formula 21]
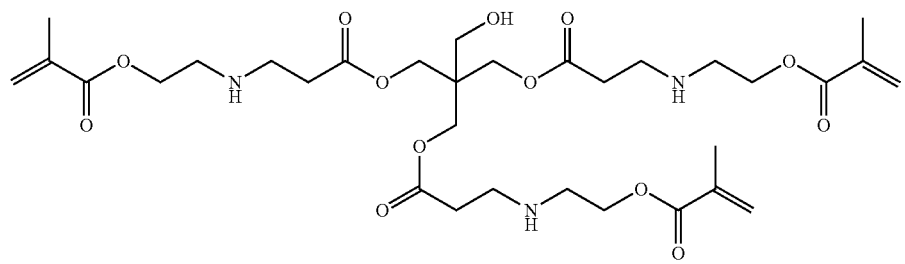
[Formula 22]
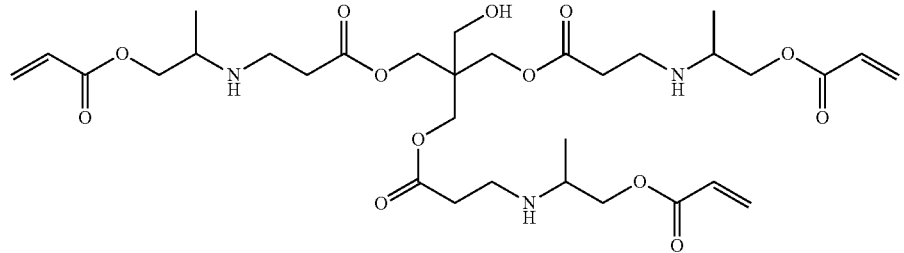
[Formula 23]
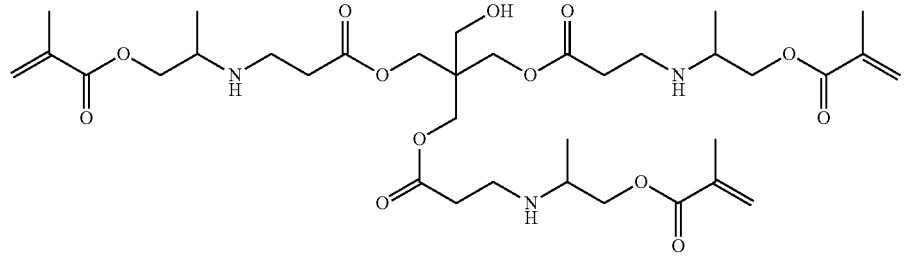
[Formula 24]
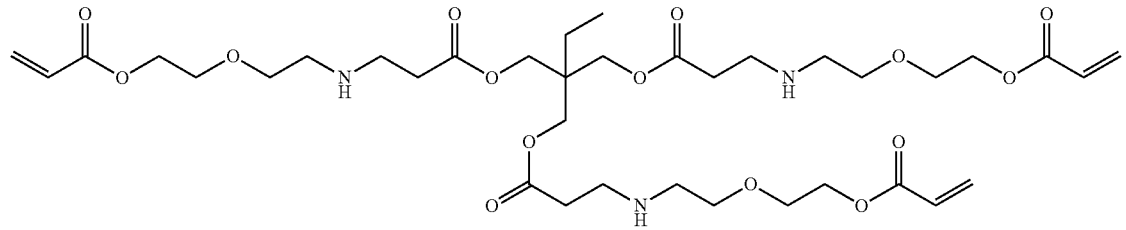
[Formula 25]
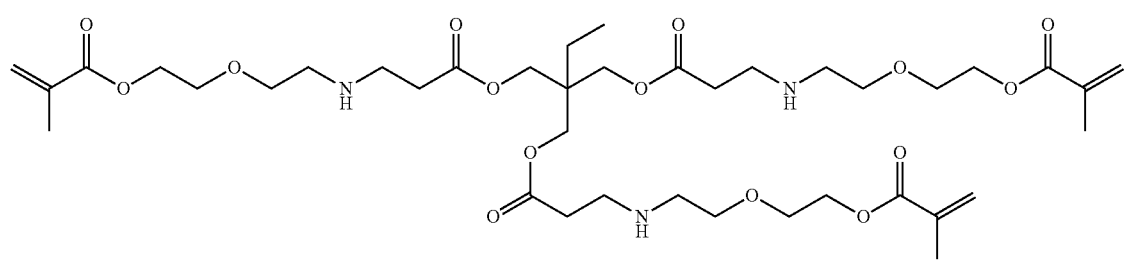

[Formula 26]
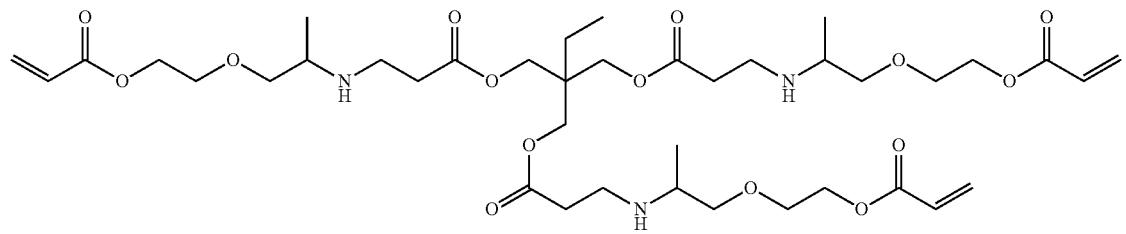
[Formula 27]
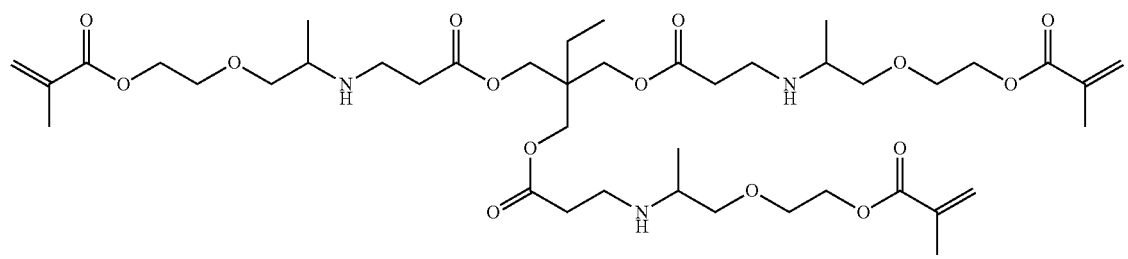
[Formula 28]
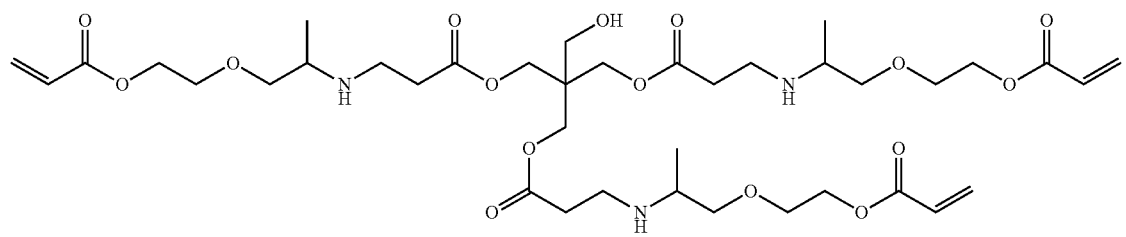
[Formula 29]
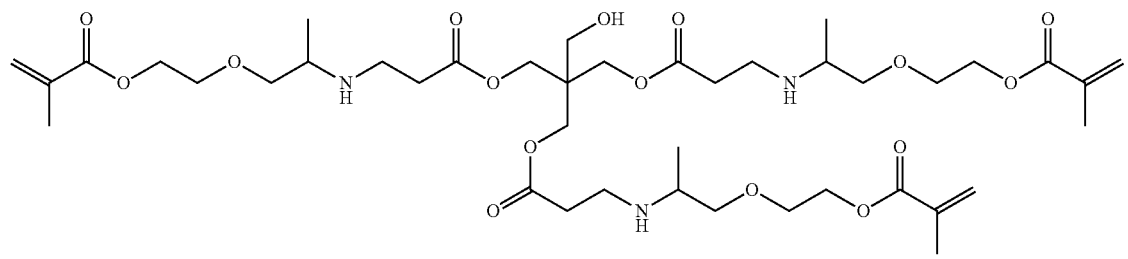
[Formula 30]
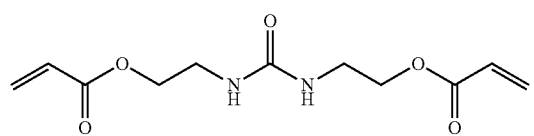
[Formula 31]
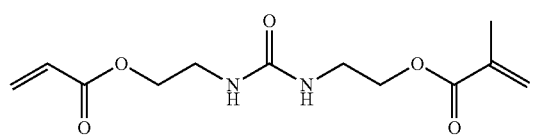
[Formula 32]
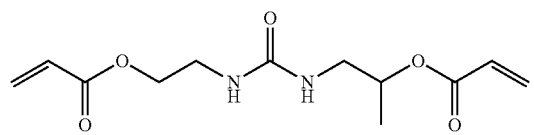
[Formula 33]
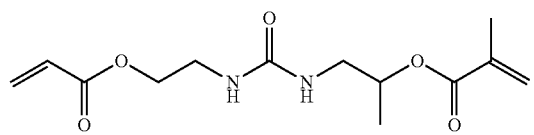
[Formula 34]
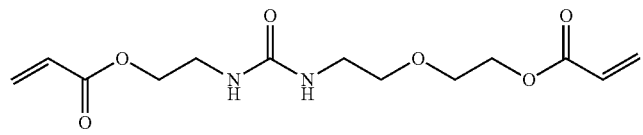

-continued

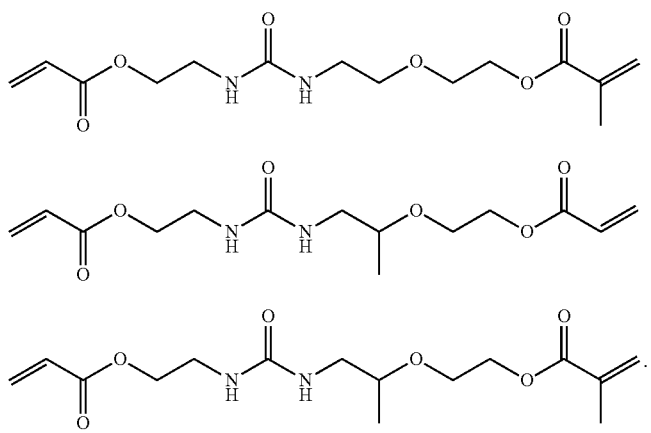

4. The polarizing plate of claim 1, wherein the radical curable composition comprises 40 to 85 parts by weight of the first compound, 5 to 50 parts by weight of the second compound, and 0.1 to 10 parts by weight of the radical initiator, based on 100 parts by weight of the radical curable composition.

5. The polarizing plate of claim 1, wherein the radical curable composition further comprises an acrylic monomer comprising an amine group as a third compound.

6. The polarizing plate of claim 5, wherein the third compound is one or more selected from the group consisting of N,N-dimethyl acrylamide, acryloyl morpholine, N-isopropyl acrylamide, N,N-diethyl acrylate, N,N-dimethylamino propylacrylamide, and 1,2,2,6,6-pentamethyl-4-piperidinyl methacrylate.

7. The polarizing plate of claim 5, wherein a content of the third compound is 5 to 20 parts by weight based on 100 parts by weight of the radical curable composition.

8. The polarizing plate of claim 1, wherein the radical curable composition has a glass transition temperature of 60° C. or more after UV curing.

9. The polarizing plate of claim 1, wherein the radical curable composition has a storage modulus of 1,000 MPa to 5,000 MPa, which is measured by a dynamic mechanical analysis (DMA) method at 25° C. after curing.

10. The polarizing plate of claim 1, wherein the first protective layer has a thickness of 0.1 μm to 20 μm.

11. The polarizing plate of claim 1, wherein a second protective film is attached through an adhesive layer to a surface opposite to the surface of the polarizer on which the first protective layer is formed.

12. The polarizing plate of claim 1, further comprising: an adhesion layer provided on an upper portion of the first protective layer.

13. The polarizing plate of claim 1, wherein the polarizer is a polyvinyl alcohol-based film in which iodine or a dichroic dye is adsorbed and oriented.

14. An image display device comprising the polarizing plate of claim 1.

15. A polarizing plate comprising:
a polarizer; and
a protective layer formed on at least one surface of the polarizer,
wherein the protective layer is a cured product of a radical curable composition comprising:

(A) a first compound represented by the following Formula 1;
(B) a second compound obtained by reacting an aziridine compound with (meth)acrylic acid or a (meth)acrylate having a hydroxy group; and
(C) a radical initiator,

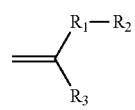

[Formula 1]

wherein in Formula 1:
$R_1$ is an ester group; or an ether group, $R_2$ is a C1 to C10 alkyl group having at least one hydroxy group (—OH); or a C4 to C10 cycloalkyl group having at least one hydroxy group (—OH), and $R_3$ is hydrogen; or a C1 to C10 alkyl group.

16. The polarizing plate of claim 15, wherein the aziridine compound is selected from the group consisting of compounds represented by the following Formula 10 to Formula 12:

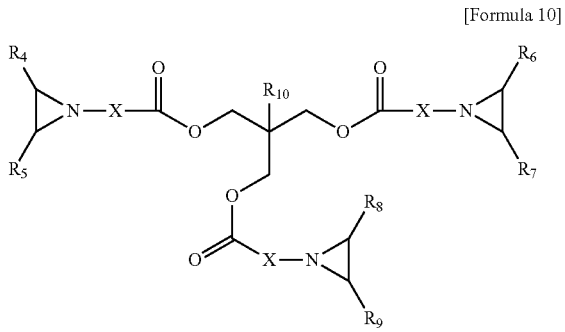

[Formula 10]

wherein In Formula 10, $R_4$ to $R_9$ are each independently a hydrogen atom; or a $C_{1\ to\ 12}$ alkyl group, $R_{10}$ is a hydrogen atom; or a substituted or unsubstituted $C_{1\ to\ 5}$ alkyl group, and X is a $C_{1\ to\ 5}$ alkylene group,

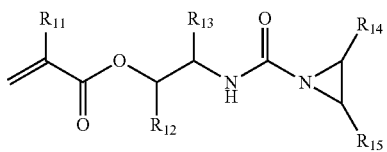

[Formula 11]

wherein in Formula 11, $R_{11}$ is a hydrogen atom; or a methyl group, and $R_{12}$ to $R_{15}$ are each independently a hydrogen atom; or a $C_1$ to $C_{12}$ alkyl group,

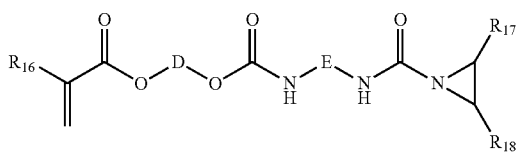

[Formula 12]

wherein in Formula 12, $R_{16}$ is a hydrogen atom; or a methyl group, $R_{17}$ and $R_{18}$ are each independently a hydrogen atom; or a $C_1$ to $C_{12}$ alkyl group, D is a $C_2$ to $C_5$ alkylene group; or an alkylene glycol having a repeating unit of 2 to 100, and E is a substituted or unsubstituted $C_4$ to $C_{20}$ alkylene group; or a $C_6$ to $C_{20}$ arylene group.

17. The polarizing plate of claim 15, wherein the (meth) acrylate having a hydroxy group is represented by the following Formula 13:

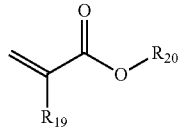

[Formula 13]

wherein in Formula 13, $R_{19}$ is a hydrogen group; or a methyl group, and $R_{20}$ is a C1 to C10 alkyl group having at least one hydroxy group (—OH); or a C4 to C10 cycloalkyl group having at least one hydroxy group (—OH).

* * * * *